US006580510B2

(12) United States Patent
Nawracala

(10) Patent No.: US 6,580,510 B2
(45) Date of Patent: Jun. 17, 2003

(54) SELF-CALIBRATING MEASURING SETUP FOR INTERFERENCE SPECTROSCOPY

(75) Inventor: Bernd Nawracala, Karlsruhe (DE)

(73) Assignee: Agilent Technologies Inc., Palo Alto, CA (US)

( * ) Notice: Subject to any disclaimer, the term of this patent is extended or adjusted under 35 U.S.C. 154(b) by 344 days.

(21) Appl. No.: 09/727,548

(22) Filed: Dec. 4, 2000

(65) Prior Publication Data

US 2001/0055118 A1 Dec. 27, 2001

(30) Foreign Application Priority Data

Dec. 2, 1999 (DE) .......................................... 199 58 136

(51) Int. Cl.[7] ................................................ G01B 9/02
(52) U.S. Cl. .................................. 356/451; 250/339.09
(58) Field of Search ................................ 356/451, 456, 356/319; 250/339.07, 339.08, 339.09

(56) References Cited

U.S. PATENT DOCUMENTS

| | | | | |
|---|---|---|---|---|
| 5,557,404 A | * | 9/1996 | Matsui et al. | 356/319 |
| 5,838,438 A | * | 11/1998 | Peale et al. | 356/451 |
| 6,236,459 B1 | * | 5/2001 | Negahdaripour et al. | 356/496 |
| 6,377,899 B1 | * | 4/2002 | Sakai et al. | 702/104 |

FOREIGN PATENT DOCUMENTS

| | | |
|---|---|---|
| DE | A4200088 | 7/1993 |
| DE | A19719210 | 11/1998 |
| DE | A19928410 | 1/2001 |

OTHER PUBLICATIONS

Brecht, A., Kraus, G., Gauglitz, G., "Optical sensors for environmental monitoring and basic research in bioanalytics," *Experimental Technique of Physics*, vol. 42 (1996), No. 1, 139–160.

* cited by examiner

Primary Examiner—Robert H. Kim
Assistant Examiner—Hoon K. Song

(57) ABSTRACT

A procedure is described to calibrate an optical converter, especially for use in the field of reflectrometric interference spectroscopy. The converter has a layer/substrate system with a layer and a substrate. A light beam shines from the substrate side, and parts of it are reflected or transmitted at the interfaces of air/substrate, substrate/layer and layer/air. The converter in particular serves to convert the light beam into a modulated (especially frequency modulated or phase modulated) signal. The light is varied within a wavelength or frequency range from which a corresponding modulated spectrum is determined. In particular, it is assumed that the performance quantities of especially the converter and a radiation source generating the light are subject to temporal fluctuations. The calibration is carried out in particular by determining reference values of the modulated spectrum at time t=0, successively determining values of the modulated spectrum for times t>0, and calculating temporal changes in the modulated spectrum for t>0 using in particular a linear disturbance equation based on the assumed infinitisimal changes in at least one of the performance quantities so the interference spectroscopy measuring setup.

19 Claims, 3 Drawing Sheets

SELF-CALIBRATING MEASURING SETUP FOR INTERFERENCE SPECTROSCOPY

DESCRIPTION

Figure 1:
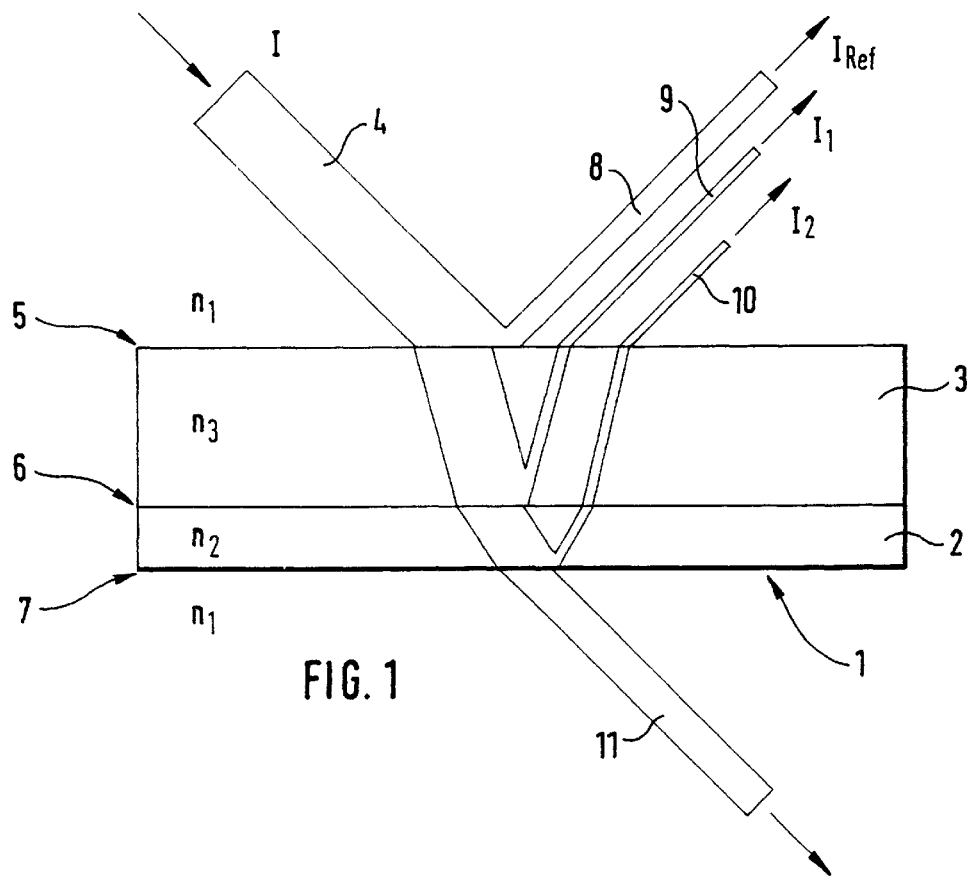

The invention concerns in general a spectroscopic measuring method using optical converters to detect changes of optical thickness in optically-active parts of such a converter as e.g. occur in reflectrometric interference spectroscopy in the fields of chemical or biochemical analysis, and especially in the field of microfluid laboratory measuring systems. The invention concerns in particular a method for the spectroscopic measurement of an optophysical quantity or its change over time using the cited optical converter to convert the optophysical quantity into a modulated (especially frequency or phase-modulated) signal. The converter is conventionally transilluminated with electromagnetic radiation (especially in the visible range) for a period of t>=0, whereby the electromagnetic radiation varies within a wavelength or frequency range, and a corresponding modulated spectrum is determined from this, and whereby the performance quantities of the interference spectroscopy measuring setup, especially of the converter and a radiation source that generates the electromagnetic radiation, are subject to temporal fluctuations.

For a number of decades, chemical and biochemical sensors of the cited type have been used for research and commercial use. Optical measuring procedures are of particular interest that allow contact-free and hence non-destructive sensing of the relevant optical quantities. These methods are particularly distinguished in that they can be carried out in situ on the samples to be investigated, especially remote controlled. In particular, these methods are increasingly being used for microfluid laboratory measuring systems in which laboratory microchips are used. Such a microchip is e.g. described in detail in the patent application by the present applicant with the title, "Device to Operate a Laboratory Microchip" (official application number DE 199 28 410.5), in particular in FIGS. 1 and 2 to which full reference is made in the present context.

Reflectrometric interference spectroscopy (RifS) is a standard method for characterising structural properties of a surface, and it has been recognised as a fundamental optical converter principle in the field of chemistry or biosensor technology since the early nineties. This procedure uses the interference of white light reflected on a thin, non-absorbing optical layer. The spectral distribution of the reflected light intensity is measured, whereby the respective film thickness is determined by evaluating the obtained interference spectrum. The evaluation is carried out with a high degree of precision by determining the respective wavelength of the interference peaks and their shift in relation to the wavelength in relation to the film thickness.

With these prior-art sensors, the film thickness is determined from a spectrum measured in a reflection or transmission by evaluating the position of one or more base points of the spectrum, e.g. curve extremities (maximum, minimum, or points of inflection), and calculated via a curve computationally adapted to the respective spectrum. Such a measuring setup is e.g. disclosed in DE 4 200 088 C2. Alternately to the evaluation in the spatial domain described therein, the spectra can be evaluated using changes in a modulation frequency of a corresponding signal in the pulse domain, i.e., in the frequency domain whereby prior-art methods of Fourier transformation are used. A corresponding method is e.g. described in an article by G. Kraus and G. Gauglitz: "Application and Comparison of Algorithms for Evaluation of Interferograms," in Fresenius J. Anal. Chem. 344, 153 (1992).

To obtain the interference spectrum required for evaluation from the measured intensity data, calibration is necessary is all the cited cases. This calibration is usually done by forming a quotient with a reference spectrum that is either done before the actual measurement using as a basis the measuring setup provided for the measurement, or during the actual experiment using an identical, similar or different measurement setup. The referencing is done either initially, i.e., once, or continuously during measurement by determining reference spectra.

The disadvantage of a single calibration done before the actual experiment is that any arising fluctuations during the experiment, e.g. in the spectral sensitivity of the measuring setup due to changes in the colour temperature of the utilised radiation source or the spectral sensitivity of the utilised optical components or their measuring sensitivity cannot be covered or compensated during measurement, and these fluctuations necessarily lead to the distortion of the measurement results.

In contrast, calibration or referencing done at the same time as the experiment has the disadvantage that a second, if possible identical measuring arrangement is required whereby the measuring beam is directed using a beam divider both in the actual measuring setup and in the reference measuring setup. In particular, the beam division worsens the signal-to-noise ratio since the beam intensity is reduced by half, and the overall quality of the measurement results is worsened.

Another problem inherent in the prior-art interference measuring methods is that the reference points (especially interference extrema) of the evaluated spectra produce a shift in the extrema when the performance quantities of individual components or the entire measuring setup change, and hence produce an apparent change in the measured path lengths or layer thicknesses.

The present invention is hence based on the problem of presenting a method of the initially-described type and a corresponding measuring setup that avoids the cited disadvantages of the state-of-the-art. To be avoided in particular are distortions of the measuring results due to changes in performance quantities of the measuring setup and a simultaneous worsening of the signal-to-noise ratio.

The problem is solved by the features of the independent claims. Advantageous embodiments are cited in the dependent claims.

The particular feature of the invention is that the intensity distribution measured at time t=0 is used as a reference spectrum for all other measurements (self-referencing), and the relative change (and not the measured quantity itself as is conventional) is determined for time t>0 to identify the changes in the optical path length or optical thickness by evaluating the modulation amplitude of this "differential" spectrum.

The concept on which the invention is based is in particular to differentiate whether the temporal changes of the modulated spectrum are changes in the path length or optical thickness to be determined in the respective measurement, or only fluctuations in the performance quantities of the measuring setup. A disturbance calculation is continuously made based on the assumed changes in the performance quantities to separate the actual measurement effects from the cited distortion of the measurement signals using the disturbance calculation.

Let it be noted that the term "light optics" in the present context refers to the entire wavelength range between infrared (IR) and ultraviolet (UV).

In a preferred exemplary embodiment, a disturbance of the measured quantity is assumed to be a $+b\lambda$ that results in a shift $\Delta\lambda$ of an extremum to be expected at a point, according to the relationship:

$$\Delta\lambda = \frac{b}{\left[\frac{\partial^2 R_D(\lambda)}{\partial \lambda^2}\right]_{\lambda=\lambda_0}} \qquad (1)$$

Where $RD(\lambda)$ is the reflectivity depending on $\lambda$, and where the position of the extremum is given by the following depending on the optical layer thickness D:

$$\lambda_0(D) = \frac{4D}{k} \qquad (2)$$

(where k=order of the respective interference extremum). Depending on the available computing power, disturbance calculations of a higher order can be carried out.

In a development of the inventive idea, the following individual steps can be carried out during the procedure:

a) determination of the reference values of the modulated spectrum at t=0;

b) determination of the measured values, and a calculation of a "differential" spectrum by forming a quotient with the reference values from a) for t>0;

c) determination of a modulation amplitude of the spectrum calculated in step b);

d) calculation of a change in the optical-physical quantity from the modulation amplitude determined in step c).

In regard to determining the amplitude of the calculated modulated spectrum according to step c), mathematical relationships between the quantity to be measured and the beam intensity measured in transmission or reflection can be advantageously used. As an example, let us take an expression shown below in equation (3) that reflects the known mathematical relationship of the reflectivity of a thin optical layer under normal light at the point of incidence and slight reflection. From the modulation amplitude of the differential spectrum calculated in this manner, we can determine changes in the optophysical quantity to be measured as will later be discussed in detail.

$$R_D(\lambda) = R_1 + R_2 + 2\sqrt{R_1 R_2} \cos\left(\frac{4\pi D}{\lambda}\right) \qquad (3)$$

In equation (3), D is the optical thickness of the layer, and quantities $R_1$, $R_2$ are the reflectivity of a substrate layer at the substrate/layer and layer/sample transitions. The amplitude of the differential spectrum is advantageously evaluated by adapting curves to a model function (e.g. a polynomial), whereby purely statistical noise suppression already exists. In addition, variable instrument quantities can be thereby suppressed.

The method suggested according to the invention can be advantageously used in a layer system in a microfluid microchip consisting of at least two, at least partially optically transparent layer components, whereby the optophysical quantity represents an optical path length according to the mathematical product consisting of the refraction index or indices of the respective layer component(s), and the respective physical length, especially the physical thickness of at least one of the layer components.

The invention will be described below with reference to exemplary embodiments using drawings. Other problems, advantages and features of the invention are found in the features of the patent claims.

Figure 3:
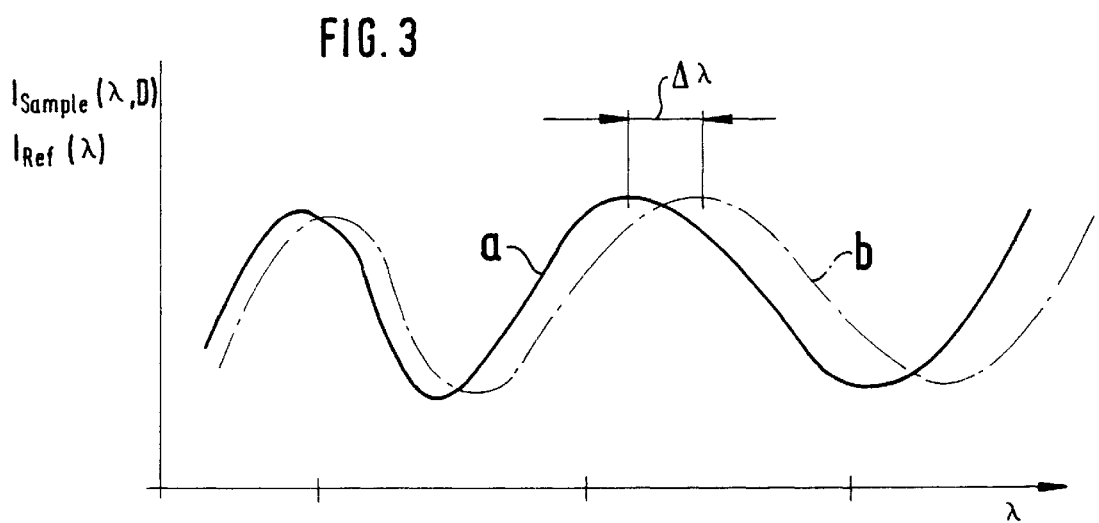
Figure 2:
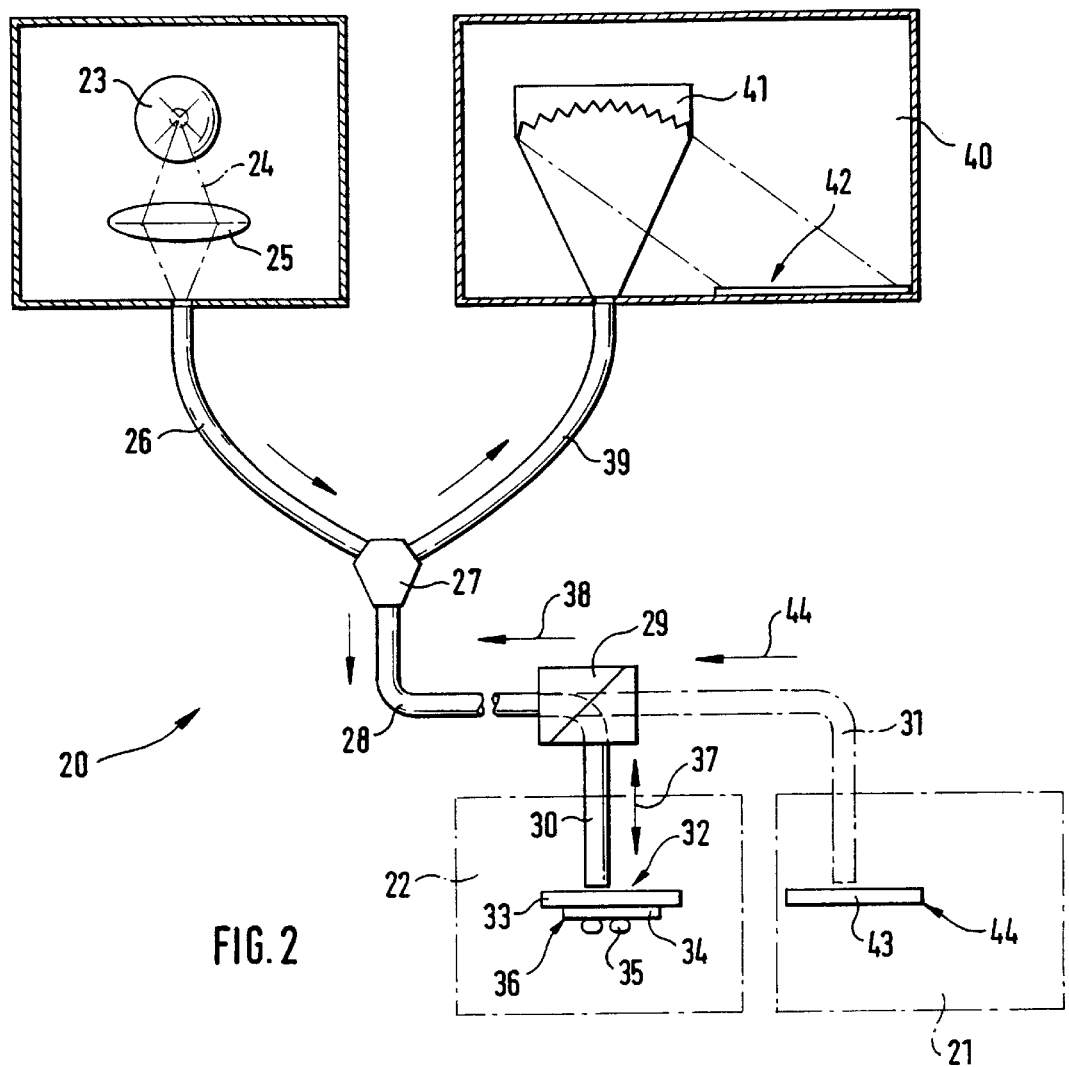
Figure 4:
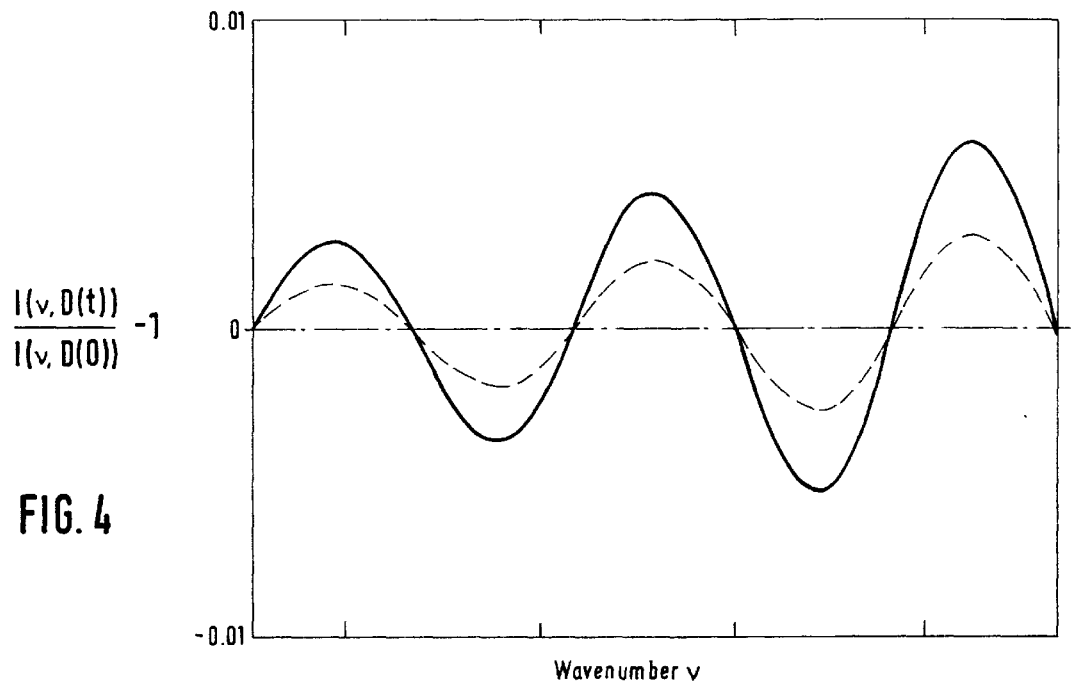
Figure 5:
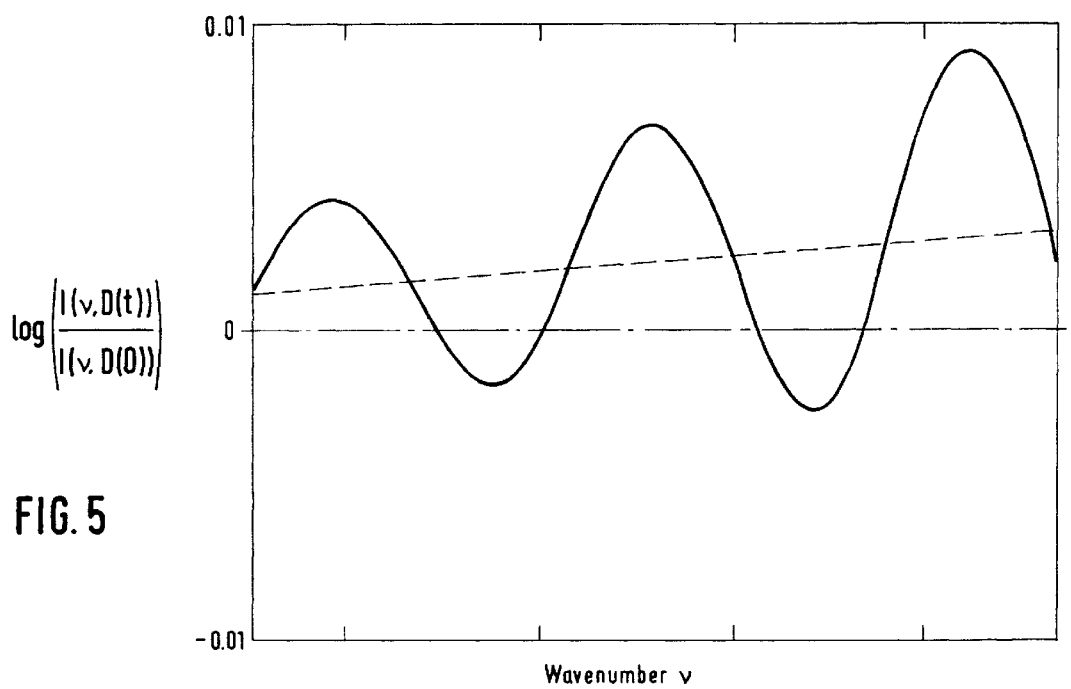

Shown in particular are:

FIG. 1 Schematic representation of the beam path of typically occurring interference in an optical converter with a thin, optically-transparent layer and an optically-transparent substrate;

FIG. 2 Means to sequentially measure a reference and sample intensity distribution using a state-of-the-art photospectrometer;

FIGS. 3a, b Typical reflection spectra obtained with a conventional measuring setup for the following instances: a) Constant optical thickness $D_0$ and b) An optical thickness $D_1$ with $D_1 > D_0$ (state of the art);

FIG. 4 A spectrum obtained using the self-referencing method according to the invention for an optical thickness $D_1$ with $D_1 > D_0$;

FIG. 5 A spectrum according to the invention with a change of the spectral characteristic of one of the optical components of the measuring setup arising during measurement.

The invention will be described in the following with reference to an exemplary embodiment in the field of reflectrometric interference spectroscopy. Of course, the invention or the concepts underlying the invention can in principle be used in other fields of optical sensor technology in which the initial signal of the respective sensor represents a modulated spectrum of a changing frequency or phase.

The method of reflectrometric interference spectroscopy (RifS) is based on the interference of white light contacting an optical converter, whereby the converter has at least one thin optically transparent layer (the layer to be investigated) that is applied on an optically transparent substrate. Such a layer substrate system 1 with a layer 2 and a substrate 3 is schematically represented in FIG. 1. A light beam 4 coming from the substrate 3 side is partially reflected 8–10 or transmitted 11 by the boundary layers of air/substrate 5, substrate/layer 6, and layer/air 7. In such a system, there are at least three areas with different refraction indices, i.e., air with $n_1$, substrate with $n_2$, and the layer with $n_3$.

The basis of the actual effect of the converter as a sensor can be that the layer 2 is subject to a chemical or biological reaction, e.g. an antibody antigen reaction in a microfluid laboratory system. The layer 2 can also be a polymer film that swells from the absorption of hydrocarbon molecules from a gas flowing by. In both cases, the optical thickness changes, i.e., the product of the refraction index and physical layer thickness, corresponding to layer 2.

In conventional RifS converters, the reflection component $R_D(\lambda)$ of the incident beam can be modelled as a function of the wavelength $\lambda$ at an assumed plane-parallel, non-absorbent layer with a low reflectivity, and a beam normal at the point of incidence can be modelled by a two-beam interference expression according to the initially cited equation (3). An assumed change in the optical thickness D is expressed as a frequency change of the cosine expression (in reference to the wave number) in this equation and is normally determined by measuring the shift of the wavelength or wave number of a particular extremum (see equation 2).

As described in greater detail above, a shift of an extremum also occurs when the instrument quantities change, e.g. a change in the spectrum of the utilised light source or the detector sensitivity. An additive disturbance a+bλ for example causes a shift according to equation (1). Let it be noted that given the denominator in equation (1), the λ shift is stronger the wider the curve shape of the observed extremum.

A conventional state-of-the-art photospectrometer 20 for use in the method according to the invention will now be described with reference to FIG. 2. The spectrometer 20 is calibrated using sequential measurements of intensity distributions obtained with a reference measurement setup 21 and a sample measuring setup 22. Divergent polychromatic light 24 emitted by a light source 23 is first fed through a lens 25 or lens system into a glass fibre cable 26. By means of an optical shunt 27, the beam reaches another glass fibre cable 28 and passes into a beam divider 29. At the beam divider, the beam is divided into a partial beam that is guided via another glass fibre cable 30 into the actual sample measuring setup 22, and another partial beam that is guided via a glass fibre cable 31 into the reference measuring system 21.

In the sample measuring setup 22, the beam is sent collimated as much as possible to a substrate layer system 32 corresponding to FIG. 1. The beam contacts the substrate layer system 32 from the substrate 33 side, whereby a layer 34 is on the bottom of the substrate. The actual substance 35 to be investigated is on or adheres to the surface of the layer 34. This substance influences the boundary layer 36 between the substance 35 and the layer 34 in such a manner that the reflectivity at the boundary layer 36 is substantially determined by the chemical or physical properties of the substance 35. The back-reflected light interferes with the light reflected at the boundary layer between the substrate 33 and layer 34 indicated by the double arrow 37. The back-reflected beam then passes through the glass fibre 28 in reverse direction 38 and is sent to another glass fibre 39 at the shunt 27. This beam then reaches a spectrometer 40 in which the beam is bent by a groove grating, and the bent beam is depicted on a photodiode line 42. The spectrum that is measurable due to the diffraction can then be evaluated using conventional methods.

In the reference measuring system 21, the incident beam is guided via the glass fibre 31 collimated as much as possible to a substrate 43 that has no layer. This creates a situation where the beam 44 back-reflected from the reference system can serve as a reference spectrum or master standard. A suitable changeover switch on the beam divider 29 is used for calibration, and it switches sequentially between measurement in the sample measuring setup 22 and measurement in the reference measuring setup 21.

In FIG. 3a, a typical reflection spectrum (calculated as the quotient of the measurement quantities $I_{sample}(\lambda, D)$ and $I_{ref}(\lambda)$) of a thin layer with optical thickness $D_0$ is plotted as a function of the wavelength λ as would result according to the state of the art. FIG. 3b shows the reflection spectrum of the layer with a changed thickness $D>D_0$, and the resulting shift in the observed maximum by amount Δλ.

Instead of determining the ratio $I_{sample}/I_{ref}$, the following quantity is successively determined according to the invention, whereby an optical thickness $D_0$ with t=0 is assumed:

$$\frac{I_{sample}(\lambda, t)}{I_{sample}(\lambda, t = 0)} = 1 + \left[\frac{\partial R_D(\lambda)}{\partial D}\right]_{D=D_0} \Delta D(t)/R_{D_0}(\lambda) \quad (4)$$

This expression results from a linear disturbance calculation based on a Taylor expansion with termination after the first Taylor element. If the changes in the optical thickness D are small, this represents a sufficient approximation. The right side of the equation (4) is referred to in the following as $1+\Delta R_{rel}(\lambda, \Delta D)$. As can be seen in equation (4), the modulation amplitude of the spectrum $\Delta R_{rel}$ is proportional to the cited change in optical thickness. A typical relative differential spectrum according to the invention is shown in FIG. 4. The quotient of the intensity distribution shifts I(v, D(t)) at time t>0 and t=0 is plotted in relationship to the wave number v for two different optical layer thicknesses D1 (dashed line) and D2 (continuous line) with D2>D1.

The change in the optical thickness can be determined by evaluating the modulation amplitude of the spectrum. Preferably a known mathematical relationship is assumed in this evaluation between the reflectivity of the converter and its derivation according to the layer thickness, and the measured data is adapted to this relationship e.g. by means of the least square method (curve fitting). The sought modulation amplitude of the derived spectrum is calculated from this curve fitting. Using the relationship cited in the equation (3) between the reflectivity and layer thickness, the following results for the right side of equation (4) using the wave number v instead of wavelength λ:

$$f(v) = 1 + c \frac{\sin(4\pi Dv) - v}{1 + a \cdot \cos(4\pi Dv)} \quad (5)$$

where a and D are known parameters of the converter reflectivity, and c is a fit parameter, whereby the parameter is proportional to the change in the optical layer thickness. Let it be noted that, in addition to equation (5), other fitting functions can be used such as higher order polynomials. The evaluation of the first harmonic in the frequency domain is also conceivable, and therefore the inventive idea is in no way limited to the described application.

An essential aspect of the invention is that the suggested procedure or measuring setup is highly insensitive to any changes in instrument quantities. This will be illustrated in the following with an example of a change of the beam properties of a light source emitting white light. Given a temperature change ΔT, the following relationship results for the corresponding (frequency-dependent) relative change in spectral beam density L (brightness):

$$\Delta L_{rel}(v) \approx \frac{v}{T^2} \Delta T \quad (6)$$

Let it be noted that the relative change in spectral sensitivity of photodiodes to small temperature changes also reveals similar behaviour.

In another exemplary embodiment, the subsequent logarithmic quantity will be used for curve fitting instead of the expression in equation (4). The expression is broken down into the sum of individual contributions that represent small changes in thickness:

$$\log\left[\frac{I_{sample}(v, t)}{I_{sample}(v, t = 0)}\right] \approx \Delta L_{rel}(v) + \Delta R_{rel}(v, \Delta D) + \Delta S_{rel}(v) \quad (7)$$

In equation (7), $\Delta S_{rel}(v)$ stands e.g. for the relative change in the spectral sensitivity of the detector. When logarithmic measuring signals are used, any changes in instrument quantities can be almost completely suppressed using the expanded adaptation function in equation (8) below:

$$f(v) = c_0 + c_1 v + c_2 \frac{\sin(4\pi Dv) \cdot v}{1 + a \cdot \cos(4\pi Dv)} \quad (8)$$

Where the shift of the instrument quantities is covered by the additional fit parameter $c_0$ and $c_1 v$, and fit parameter $c_2$ is a measure of the change in optical thickness. A typical example of a measurement result represented logarithmically when there is small instrumental disturbance is shown in FIG. 5. The instrumental disturbance is expressed as the additive superposition in the form $c1*v$ and can hence be covered when determining the modulation amplitude by means of a model function of the type in equation (8).

Another advantage of the invention in regard to the signal-to-noise ratio is that there is a relatively large number of measuring points available due to the described curve fitting method which, viewed statistically, improves the ratio. The number of measuring points is at least doubled since an entire modulation phase (period) is used, and not just the points around an extremum.

What is claimed is:

1. A method of spectroscopic measurement of an optical-physical quantity or its change over time with an optical converter for converting the optical-physical quantity into a modulated signal when the optical converter is transilluminated with electromagnetic radiation for a period of t>0, the electromagnetic radiation varying within a wavelength or frequency range, whereby a corresponding modulated spectrum is derived, and whereby performance quantities of the spectroscopy measurement being subject to temporal fluctuations, the method comprising:
   determining reference values of the modulated spectrum at time t=0;
   determining values of the modulated spectrum for times t>0;
   calculating the changes over time of the modulated spectrum for t>0 using a linear perturbation method based on assumed small changes of at least one of the performance quantities of the interference spectroscopy measurement.

2. The method of claim 1 wherein the measurement is a reflectrometric interference spectroscopic measurement.

3. The method of claim 2 wherein the measurement is performed by an interference spectroscopy set up including the converter and a radiation source that generates the electromagnetic radiation.

4. The method of claim 1 wherein the signal is angle modulated.

5. The method of claim 1 wherein the radiation is in the visible range.

6. The method of claim 1 further including:
   (a) determining the reference values of the modulated spectrum at t=0;
   (b) determining the measured values, and calculating a self-referenced spectrum using the reference values from step (a);
   (c) determining the modulation amplitude of the spectrum calculated in step (b); and
   (d) calculating a change in the optical-physical quantity from the modulation amplitude determined in step (c).

7. The method according to claim 1 further including performing a mathematical Taylor series expansion of a mathematical function that represents the relationship between the optical-physical quantity to be measured and at least one of the performance quantities.

8. The method according to claim 7 wherein the mathematical function is derived according to the optical-physical quantity to be measured and calculating a linear approximation.

9. The method according to claim 6 wherein the modulation amplitude of the spectrum is calculated by using curve fitting of a function that represents the relationship between the optical-physical quantity to be measured and at least one of the performance quantities.

10. The method according to claim 6 further including adapting the relationship between the optical-physical quantity to be measured and at least one of the performance quantities to a model function corresponding to the formula:

$$f(v) = 1 + c \frac{\sin(4\pi Dv) - v}{1 + a \cdot \cos(4\pi Dv)}$$

where v=wave number, c=fit parameter for the curve fitting, D=optical density, a=known parameter of reflectivity of the converter.

11. The method according to claim 6 including curve fitting the relationship between the optical-physical quantity to be measured and at least one of the performance quantities to a model function corresponding to the following fitting formula:

$$f(v) = c_0 + c_1 v + c_2 \frac{\sin(4\pi Dv) \cdot v}{1 + a \cdot \cos(4\pi Dv)}$$

where $c_0$ is another fit parameter, $c_1 v$ is a parameter that covers drift over time arising in the measuring setup, and $c_2$ is a measure of the change in thickness.

12. The method according to claim 6 further including adapting the relationship between the optical-physical quantity to be measured and at least one of the performance quantities to the model function by using a logarithmic representation of the measured values in the form of:
   $\log(I_{sample}(v, t)/I_{sample}(v, t=0))$.

13. A computer program including a program code for causing a computer to execute the steps of claim 1.

14. A data carrier storing the computer program of claim 13.

15. A method of calibrating an optical converter in a spectrometer for converting an optical-physical quantity into a modulated signal when the optical converter is transilluminated with electromagnetic radiation for a period of t>0, the electromagnetic radiation varying within a wavelength or frequency range, whereby a corresponding modulated spectrum is derived, and whereby performance quantities of the spectroscopy measurement being subject to temporal fluctuations, the method comprising:
   determining reference values of the modulated spectrum at time t=0;
   determining values of the modulated spectrum for times t>0;
   calculating the changes over time of the modulated spectrum for t>0 using a linear perturbation method based on assumed small changes of at least one of the performance quantities of the interference spectroscopy measurement.

16. A computer program including a program code for causing a computer to execute the steps of claim 15.

17. A data carrier storing the computer program of claim 16.

18. An optical converter in a spectrometer for converting an optical-physical quantity into a modulated signal when the optical converter is transilluminated with electromagnetic radiation for a period t>0, the electromagnetic radiation varying within a wavelength or frequency range, whereby a corresponding modulated spectrum is derived, and whereby performance quantities of the spectrometer are subject to temporal fluctuations, comprising a processor for determining reference values of the modulated spectrum at time t=0;

determining values of the modulated spectrum for times t>0;

calculating the changes over time of the modulated spectrum for t>0 using a linear perturbation method based on assumed small changes of at least one of the performance quantities of the interference spectroscopy measurement.

19. A spectrometer including the optical converter of claim 18.